(12) United States Patent
McCavit et al.

(10) Patent No.: US 9,970,625 B2
(45) Date of Patent: *May 15, 2018

(54) METHOD OF ILLUMINATING ORNAMENT

(71) Applicant: Jenesis International Inc., Benton Harbor, MI (US)

(72) Inventors: Kim Irvin McCavit, Saint Joseph, MI (US); Roger Don Bentley, Coloma, MI (US); Bradford Brian Jensen, Saint Joseph, MI (US)

(73) Assignee: Jenesis International, Inc., Benton Harbor, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/982,626

(22) Filed: Dec. 29, 2015

(65) Prior Publication Data
US 2016/0205753 A1 Jul. 14, 2016

Related U.S. Application Data

(60) Provisional application No. 62/102,774, filed on Jan. 13, 2015.

(51) Int. Cl.
*H05B 33/08* (2006.01)
*F21V 3/02* (2006.01)
(Continued)

(52) U.S. Cl.
CPC .......... *F21V 3/02* (2013.01); *F21V 7/00* (2013.01); *H05B 33/0845* (2013.01);
(Continued)

(58) Field of Classification Search
CPC ............ H05B 33/0854; H05B 33/0845; H05B 37/00281
(Continued)

(56) References Cited

U.S. PATENT DOCUMENTS 5,584,571 A 12/1996 Chandler et al.
5,932,139 A * 8/1999 Oshima .................. C09K 11/02
106/31.15
(Continued)

FOREIGN PATENT DOCUMENTS

WO 2014115009 A1 7/2014

OTHER PUBLICATIONS

Photographs of ornaments A-G publically available and/or on sale prior to Jan. 13, 2015 (4 pages).
(Continued)

*Primary Examiner* — Thai Pham
*Assistant Examiner* — Syed M Kaiser
(74) *Attorney, Agent, or Firm* — George Pappas (57) ABSTRACT

A method of illuminating an ornament having a light emitting source, a battery power source and a control circuit energizing the light source at desired intensities over desired durations of time. Light from the right source travels through an ornament wall. The method repeats the steps of increasing the light intensity from a low to a high intensity during a rise time period; decreasing the light intensity to a low intensity during a fall time period which is not less than the rise time period; and, maintaining the low intensity of light during a remaining time period which is not less than the combined rise and fall time periods. The low intensity of light is less than one third the high intensity. The light intensity decreased and maintained briefly at zero intensity during an off time period between the remaining and rise time periods in an imperceptible manner.

19 Claims, 11 Drawing Sheets

(51) Int. Cl.
*F21V 7/00* (2006.01)
*H05B 37/02* (2006.01)
*F21S 9/02* (2006.01)
*F21V 3/04* (2018.01)
*F21W 121/00* (2006.01)
*F21Y 115/10* (2016.01)

(52) U.S. Cl.
CPC ..... *H05B 33/0854* (2013.01); *H05B 37/0218* (2013.01); *H05B 37/0281* (2013.01); *F21S 9/02* (2013.01); *F21V 3/049* (2013.01); *F21W 2121/00* (2013.01); *F21Y 2115/10* (2016.08)

(58) Field of Classification Search
USPC ............................. 315/158, 224, 113, 185 R
See application file for complete search history.

(56) References Cited

U.S. PATENT DOCUMENTS

| | | | |
|---|---|---|---|
| 5,994,844 A | | 11/1999 | Crawford et al. |
| 6,992,591 B2 * | | 1/2006 | Jensen ................ F21S 9/02 340/326 |
| 8,144,740 B1 * | | 3/2012 | Brown ................ G03F 7/70025 372/32 |
| 2005/0063194 A1 * | | 3/2005 | Lys ..................... B60Q 1/2696 362/545 |
| 2005/0200939 A1 * | | 9/2005 | Huibers ............. G02B 26/0841 359/290 |
| 2006/0120080 A1 * | | 6/2006 | Sipinski ................ A01M 1/205 362/253 |
| 2007/0159422 A1 * | | 7/2007 | Blandino ............ A01M 1/2033 345/82 |
| 2007/0188427 A1 * | | 8/2007 | Lys .................... H05B 33/0815 345/82 |
| 2009/0147523 A1 | | 6/2009 | Levon |
| 2011/0109228 A1 * | | 5/2011 | Shimomura ....... H05B 37/0245 315/113 |
| 2012/0016174 A1 * | | 1/2012 | De Taboada ............. A61N 5/04 600/2 |
| 2012/0062123 A1 | | 3/2012 | Jarrell et al. |
| 2013/0057177 A1 | | 3/2013 | Bailey et al. |
| 2014/0247132 A1 * | | 9/2014 | Fukuma .................. G09G 3/14 340/815.45 |
| 2015/0205261 A1 * | | 7/2015 | Kawauchi ............. G03H 1/265 359/3 |
| 2016/0149372 A1 * | | 5/2016 | Marincek ............... A61B 18/20 606/3 |
| 2016/0158487 A1 * | | 6/2016 | Colbaugh ............ A61N 5/0618 607/88 |

OTHER PUBLICATIONS

International Search Report in related PCT/US2015/068303.
Written Opinion of the International Searching Authority in related PCT/US2015/068303.

* cited by examiner (Prior Art)

Fig. 1A

(Prior Art)

(Prior Art)

METHOD OF ILLUMINATING ORNAMENT

CROSS REFERENCE TO RELATED APPLICATIONS

This application claims priority under 35 U.S.C. 119(e) of U.S. provisional patent application Ser. No. 62/102,774 filed on Jan. 13, 2015 entitled ILLUMINATED ORNAMENT the disclosure of which is hereby incorporated herein by reference.

BACKGROUND OF THE INVENTION

1. Field of the Invention

The present invention relates generally to a battery powered, illuminated ornament. More specifically, the present invention is a battery powered, illuminated ornament that can provide even illumination of the exterior surface of the ornament, never appears to turn the light source completely off, and can run for an entire holiday season on a single set of batteries.

2. Background

The use of illuminated ornaments and decorations to celebrate various holidays is well known. Strings of tights consisting of small incandescent or LED bulbs, often referred to as Christmas Tree Lights or light strings, are a typical example. These are typically just bare bulbs spaced along a string of conducting wires, usually powered from the AC house mains. When ambient light levels are high, these light strings appear as a multitude of brightly lit, often multicolored, points of light. At lower ambient light levels, they also serve to illuminate portions the object which supports them, typically a Christmas tree, and any other decorations that might be near the string of tights. Sometimes the bare bulbs on these light strings are placed within a translucent ornament, which changes the appearance from a single point of light into an illuminated shape. A major drawback to using string lights, with or without the attached ornament, is that a source of AC power is required. Typically this requires the use of long extension cords to supply power to the area that is to be illuminated, especially when the light strings are used in outdoor locations. Another drawback is that since the bulbs are spaced along the string at an interval determined by the manufacturer, there is very little flexibility in the placement of the bulbs or, if present, the attached translucent ornament. A further drawback is that when the ambient light level is high, the conductive wires between each bulb are visible and detract from the intended decorative effect.

Another variety of illuminated ornament uses a light source inside the ornament and a short cord with a plug that matches the sockets used in a typical Christmas tree light string. At the desired location, one of the bulbs is removed from the light string, and the plug on the ornament is inserted into the empty socket. While this allows the glowing ornament to be positioned with more flexibility, it still must be located near the string flights and does not address the difficulties of having to supply AC power for the light string or address the issue of unsightly wiring.

One way to eliminate the need to run AC power to the desired location of the ornament is to use one or more batteries to supply power for the light source. Small coin cell batteries can be concealed within an ornament and their small size allows an even illumination of the ornament with a minimal amount of shadowing caused by internal structures within the ornament. However, the capacity of these small batteries is limited and they can provide a visibly attractive light level for only a short amount of thine. During a typical holiday season, the batteries need to be replaced quite often resulting in increased operating cost and increased inconvenience. To increase the useful battery life, one option is to blink the light source on only briefly and leave it off most of the time. While this approach can greatly extend battery life, for the large majority of the time the ornament is completely dark which greatly reduces its decorative effect.

Another option to increase battery life is to use larger batteries. These can be placed in an external battery enclosure and connected to the ornament by wires, but the wires and the battery enclosure are unsightly and compromise the decorative effect of the ornament. The battery enclosure can be integrated into the design, for instance as a rectangular base that the ornament is attached to, but this limits the ornament designs that are possible. For instance, a typical shape for Christmas tree ornaments is a globe. Attaching an enclosure for large batteries to the outside of the globe is not possible while maintaining the traditional shape.

Non-coin cell type batteries can also be placed within the ornament. In general they will have a larger volume and therefore higher capacity for a given battery technology. This approach solves the problems associated with external battery packs, either attached by wires or attached to the outside of the ornament. While providing more battery capacity, the relatively small size of most ornaments prevents the use of batteries that are large enough to power the light source at a visibly attractive level for an entire holiday season. When using a single light source, the larger battery placed within the ornament also blocks light coming from the light source from illuminating the entire surface of the ornament evenly. The shadows caused by the relatively large internal battery places restrictions on the type of lighting effects that can be achieved on the surface of the ornament. For instance, it is difficult to illuminate a spherical ornament evenly since the internal battery will cause dark shadows over much of the ornament's surface. Multiple light sources could be placed around the internal battery to evenly illuminate the surface, but this adds to the cost and complexity of the ornament.

Another difficulty occurs when using internal non-coin cell batteries in a spherical ornament that is intended to imitate the appearance of a traditional spherical Christmas tree ornament. This type of traditional ornament is often a blown glass sphere with a small opening surrounded by a raised ridge on one end. An ornamental cap with a means for hanging the ornament is attached to this opening. There are no other openings or seams in the ornament. In order to maintain the appearance of this traditional ornament in an ornament that has internal batteries, it is necessary that the batteries be inserted into the ornament through an opening that approximates the opening in a traditional ornament in size and location. This places restrictions on the size and orientation of the internal batteries making it more difficult to achieve even illumination and still provide enough battery capacity to provide a visibly attractive light level for an entire holiday season.

Another means to extend battery life is to reduce the light intensity to a very low level, thus requiring less current to be drawn from the internal batteries. As described in U.S. Pat. No. 6,992,591, it is possible to illuminate a large surface at a very low level and achieve extended battery life. While quite visible and attractive during low ambient light level conditions, this type of illumination is a little monotonous.

The introduction of brief periods of higher intensity with a pleasing pattern can greatly improve the decorative effect of such an ornament.

For ornaments intended for outdoor use, it is often desirable to use a light sensing device to turn a decorative ornament on at night and then off during the day. To avoid inconsistent operation, it is often necessary to make sure the light sensing element does not react to the light emitted from the internal light source. A typical solution to this problem is to form an opening somewhere in the ornament and then place the light sensing device so that it reacts only to light entering through this opening and is generally shielded from the internal light source. While effective, the structures needed to place the light sensing device in the proper position and prevent water from entering the opening complicate the design and increase the cost of the ornament. Another solution to this problem is to turn the internal light off briefly while the light sensing device is measuring the ambient light levels. Those familiar with the art will understand that the intensity of a light source can be controlled using pulse width modulation (PWM). Typically the light source is turned on at full intensity for some period of time and then off for a second period of time. The ratio of these two times determines the perceived intensity of the light source. If the sum of these two times is consistent and less than about 30 mS, the light source will be perceived as a steady glow. If the sum of the two times is not consistent or longer than about 30 mS, the light source will appear to flicker in an undesirable manner. By activating the light sensing device only when the light source is turned off, it becomes possible to place the light sensing device in close proximity to the light source and still measure only the ambient light conditions. While this allows the light sensing device and light source to be placed in close proximity, it requires that the light sensing device operate quickly during the brief time the light source is off. This generally requires the light sensing device to operate at relatively high currents in order to charge the stray capacitance typically found in such sensors. These relatively high currents result in shortened battery life. Instead of operating the light sensing device during the periods of time when the PWM signal is off, it would be desirable to find another time when the light source could be periodically turned off without introducing a visible flicker.

SUMMARY OF THE INVENTION

One object of the invention is to provide an illuminated ornament with internal battery or batteries with an internal light source that can provide even illumination of the exterior surface of the ornament.

Another object of the invention is to provide a visibly attractive illumination pattern that never appears to turn the light source completely off and can run for an entire holiday season on a single set of batteries.

Another object of the invention is to provide an illuminated ornament that closely resembles a typical, spherical Christmas tree ornament when not illuminated.

Another object of the invention is to provide a battery holder that hides inside the ornament, attached to a decorative cap which secures the battery holder within the ornament.

Another object of the invention is to provide a method for detecting external ambient lighting conditions without interference from the internal light source without adding openings or other structures to the ornament.

Another object of the invention is to provide a method to briefly turn off the light source within the ornament while a light sensor measures the ambient light level without any visible indication that the light source was briefly turned off.

Another object of the invention is to provide a pleasing variation in the light intensity of the ornament that includes a brief period of higher intensity light which quickly decays to a lower level of light intensity for a longer period of time where the ratio of these two time periods is calculated to achieve an extended battery life using relatively small capacity batteries.

These and other objects are achieved as is described. A battery or batteries are held in a battery holder which has a tong axis that is generally parallel to the long axis of the batteries. One end of the battery holder is attached to decorative cap. When the decorative cap is removed, the battery holder is also removed providing easy access to the batteries. A directional light source, preferably a light emitting diode (LED), and associated electronics is attached to the opposite end of the battery holder. The light source is oriented such that it directs light in a generally symmetrical pattern around a line that is generally parallel to the long axis of the battery holder and away from the battery holder. The intensity of the directional light source is generally higher directly along this axis and substantially less to the sides and behind of the light source. A diffuser in front of the light source redirects a portion of the light to the side and behind the ornament to provide even illumination over the entire surface of the ornament. The ornament is illuminated at a very low level for the majority of the time with brief periods of more intense not. A light sensing device is located inside the ornament on the same circuit board as the light source. The light source is turned off briefly when the light sensing device is active in a manner that is not perceptible to the human eye.

In one form thereof, the present invention is directed to a method of illuminating an ornament having an electric light emitting source coupled to a battery power source and a control circuit adapted to energize the light emitting source at desired light intensities over desired durations of time, and wherein light emitted by the light emitting source travels through a wall of the ornament. The method includes the consecutively repeating steps of: during a rise time period, increasing the light intensity from a low intensity to a high intensity; during a fall time period which is not less than the rise time period, decreasing the light intensity from the high intensity to the low intensity; and, during a remaining time period which is not less than the combined rise time and fall time periods, maintaining the light intensity at the low intensity.

Preferably, the low intensity of light is less than one third the high intensity of light. During a high time period occurring between the rise time period and the fall time period, the light intensity is preferably maintained at the high intensity. The fall time period is preferably at least five times greater than the rise time period and the remaining time period is at least twice as long as the combined rise time and fall time periods. The rise time is preferably less than 250 mS.

In another form thereof, the present invention is directed to a method of illuminating an ornament having an electric light emitting source coupled to a battery power source and a control circuit adapted to energize the light emitting source at desired light intensities over desired durations of time, and wherein light emitted by the light emitting source travels through a wall of the ornament. The method includes the consecutively repeating steps of: during a rise time period, increasing the light intensity from a low intensity to a high intensity; during a fall time period which is not less than the rise time period, decreasing the light intensity from the high intensity to the low intensity; during a remaining time period which is not less than the combined rise time and fall time periods, maintaining the light intensity at the low intensity; and, during an off time period occurring between the remaining time period and the rise time period, decreasing and maintaining the light intensity at a zero intensity.

Preferably, the ornament comprises a light sensing device adapted to measure ambient light and, during the off time period, further including the step of measuring the ambient light and either executing or suspending the method in response thereto. The off time is preferably less than 100 mS. The close proximity of the off time period and the rise time period makes the off time period imperceptible.

Also preferably, the low intensity of light is less than one third the high intensity of light. During a high time period occurring between the rise time period and the fall time period, the light intensity is preferably maintained at the high intensity. The fall time period is preferably at least five times greater than the rise time period and the remaining time period is at least twice as long as the combined rise time and fall time periods.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Figure 1A:
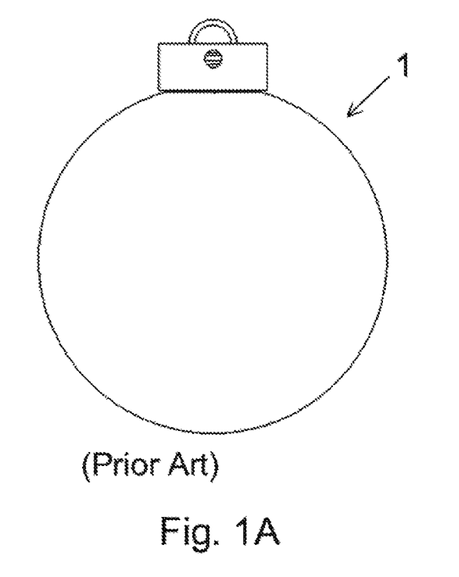
FIG. 1A shows a typical prior art illuminated ornament.
Figure 1B:
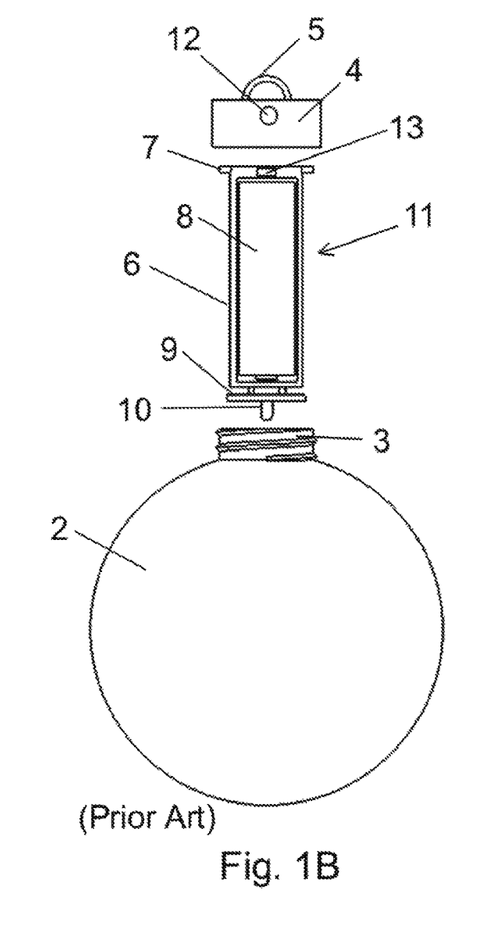
FIG. 1B shows the same ornament with the cap and battery compartment removed.

FIG. 1A shows a typical known decorative ornament (1) as might be used to decorate a Christmas tree. FIG. 1B shows the ornament (1) with the cap (4) and electronics assembly (11) disassembled as, for instance, would be necessary to replace the battery (8). The globe (2) has a short neck (3) which contains threads or other means to attach the globe (2) to the cap (4) (not shown). The electronics assembly (11) consists of a battery holder (6), a battery (8), a printed circuit board (PCB) (9), and a light source (10). The light source (10) is typically a light emitting diode (LED). An extended portion (7) of the battery holder (6) is larger than the opening in the neck (3) of the globe (2). An opening (12) allows external ambient light to enter and strike a light sensing device (13). The light sensing device (13) is positioned so that relatively little of the light from the light source (10) can reach the light sensing device (13). The opening (12) would typically be covered by a transparent lens (not shown). Creating the opening (12), the lens, and the structures needed to position the light sensing device 13) away from and shielded from the light source (10) complicates the design and add cost.

Figure 2:
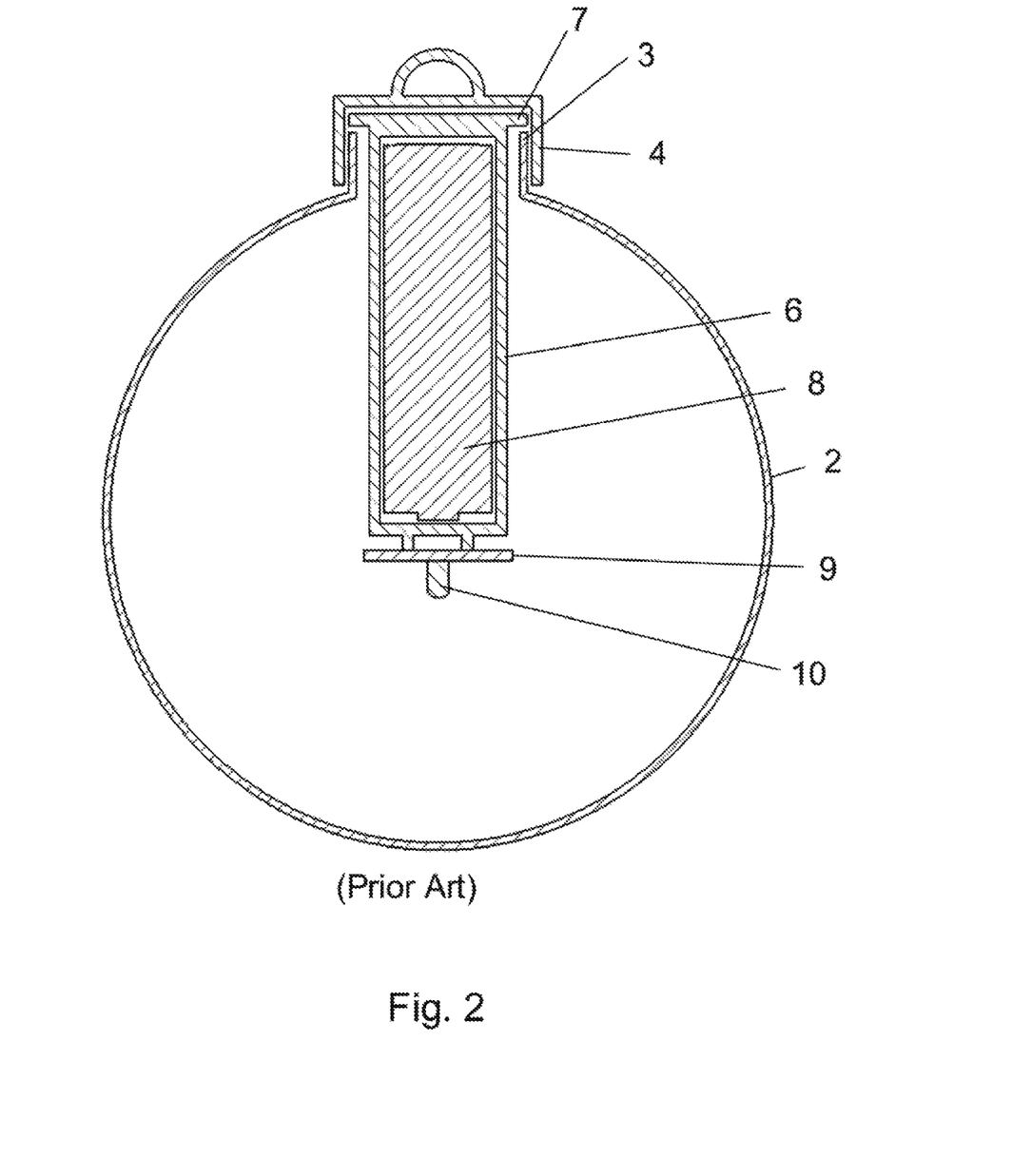
FIG. 2 shows the same ornament in cross section view.

Referring to the cross section view of FIG. 2, when the cap (4) is attached to the globe (2), the extended portion (7) is captured between the globe (2) and the cap (4) and locates the electronics assembly (11) in the desired location within the globe (2). (For simplicity, the threads used to attach the cap (4) to the globe (2) are not shown.) The extended portion (7) also prevents the electronic assembly (11) from passing through the short neck (3) and falling into the globe (2). A difficulty occurs during battery replacement since when the user unscrews the cap (4), he must then also extract the battery holder (6) from the globe (2) before he can replace the batteries, which may result in misplacing the cap (4) during battery replacement. If battery replacement is performed in an awkward location, such as on top of a ladder, needing to deal with an ornament that is in three pieces increases the likely hood a part will be dropped and possibly damaged.

Figure 3:
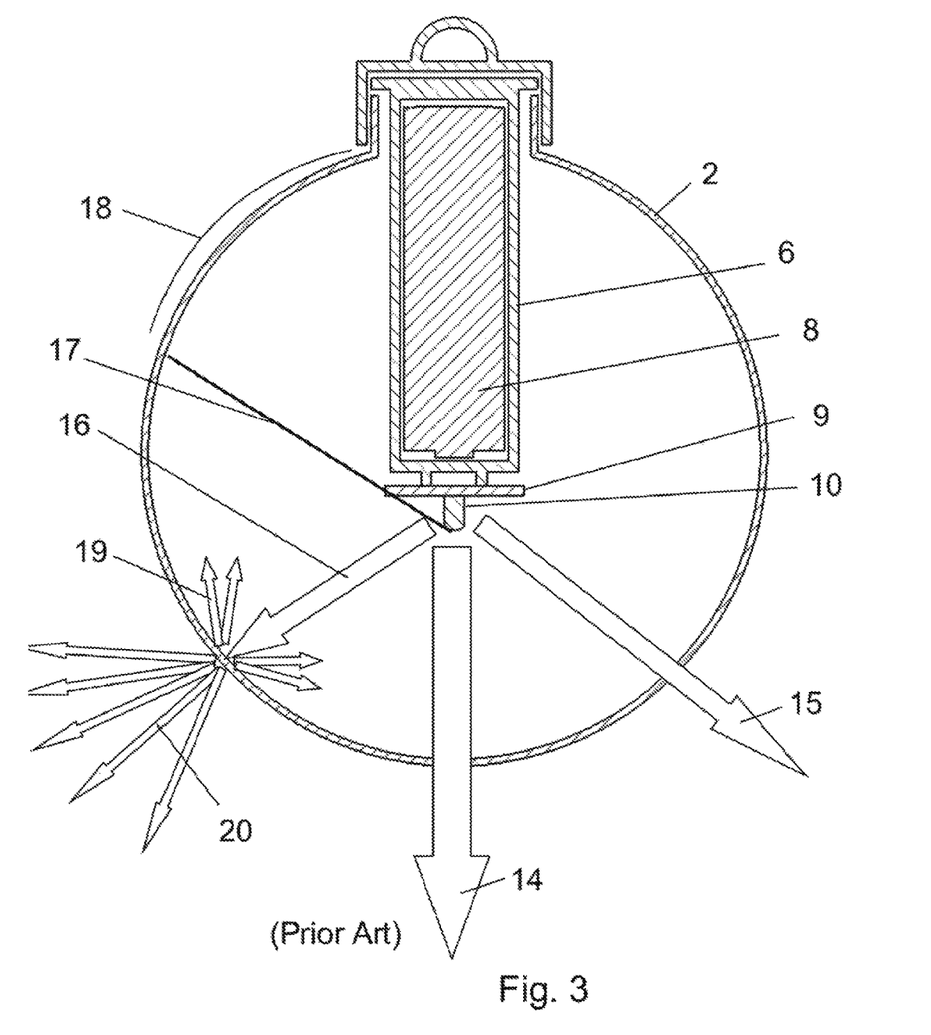
FIG. 3 shows the same ornament in cross section view with rays indicating the paths of light emitted by the light source.

FIG. 3 illustrates the illumination pattern produced by the light source (10) within the ornament (1). The light source (10), preferably an LED, is generally directional with the majority of the light emitted in the directions of ray (14), ray (15), and ray (16). This directionality combined with the position of the PCB (9), which blocks light that may have been directed behind the light source (10), results in heavily shadowed portions of the globe (2) indicated by arc (18) behind a shadow line indicated by line (17). For simplicity, only a small section is shown of the shadowed area, however it be understood that this shadowed area extends around the entire top circumference of the globe (2). If the globe (2) is generally transparent, the light emitted from the light source (10) will pass directly through the globe (2) as indicated by ray (14) and ray (15). This will result in a bright spot in the center of the globe and a very uneven illumination of the surface of the globe (2). To help achieve a more even illumination of the surface of the globe (2), a property of the globe (2) material known as haze can be increased.

Increased haze results in scattering of the light rays that strike the surface as indicated by ray (16) and scattered rays (19) and (20). The scattered rays (19) will continue and strike internal surfaces of the globe (2) that would not otherwise be illuminated. However, in practice, increasing the haze to the point where the entire globe (2) is illuminated evenly results in a large portion of the light never passing outside the globe (2). This results in a very dim ornament when the light source intensity is set to levels that will achieve an acceptable battery life.

Figures 4A, 4B:
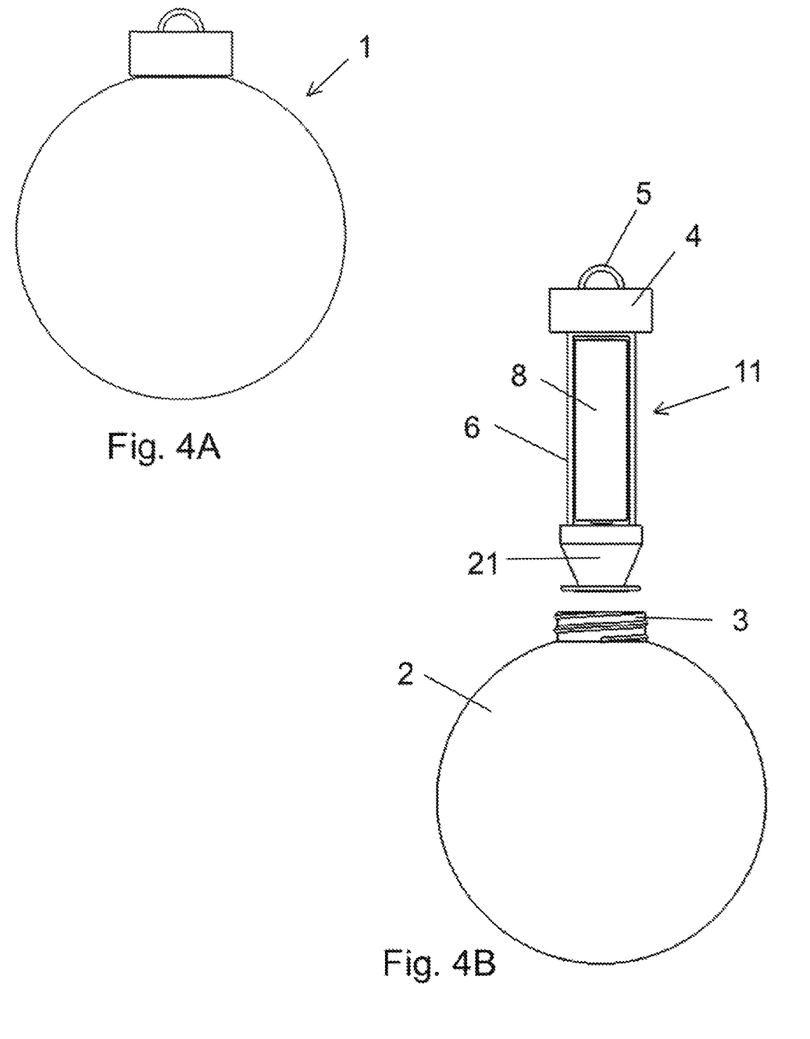
FIGS. 4A and 4B show the ornament of the present invention with the desired improvements.

FIGS. 4A and 4B show the ornament of the present invention. FIG. 4A shows the ornament when the decorative cap is installed. FIG. 4B shows the ornament with the decorative cap removed as would be necessary to replace the battery. The battery holder (6) is permanently attached to the decorative cap (4) so that the entire electronics assembly (11) is removed as one piece when the decorative cap (4) is removed thus minimizing the number of parts that must be handled during battery replacement. A diffusing/reflecting cap (21) covers the LED (10) and PCB (9).

Figure 5:
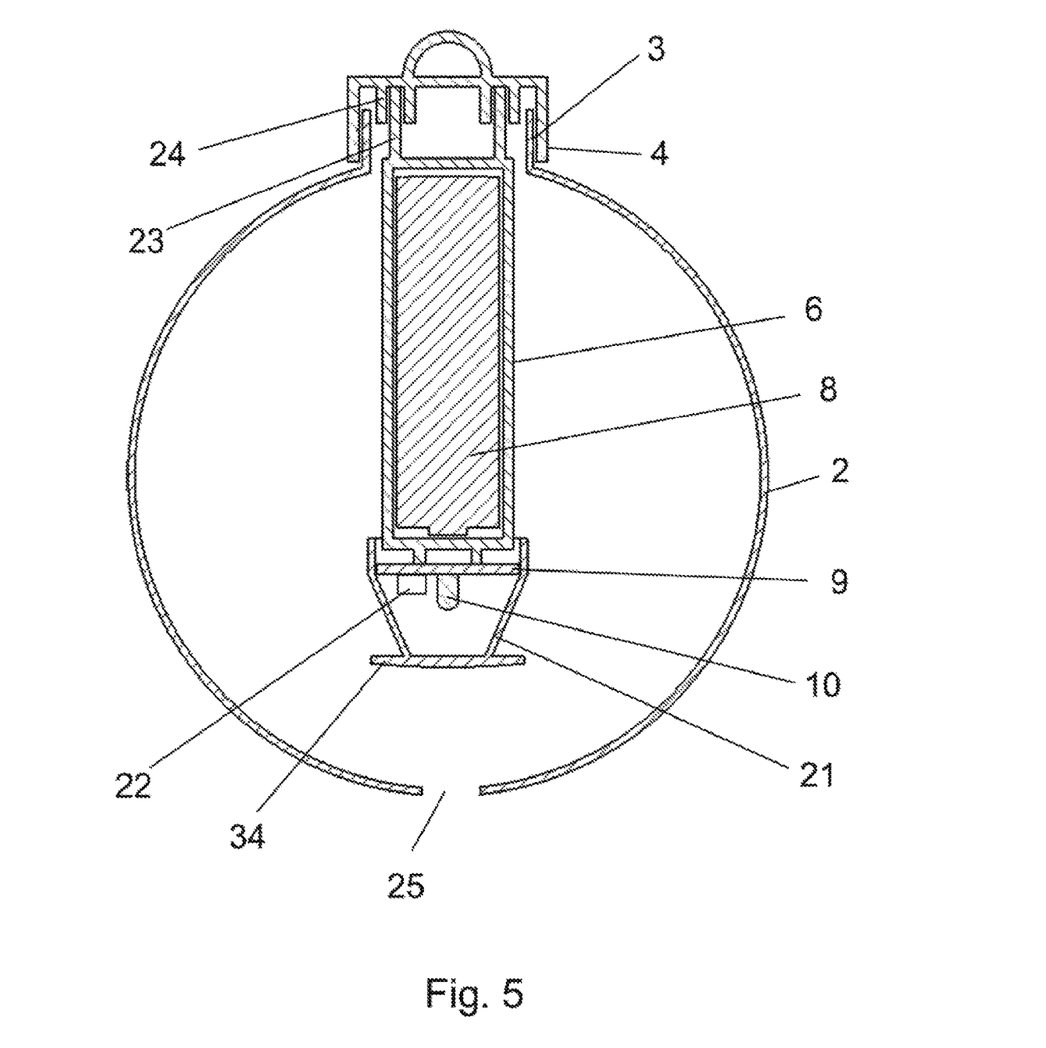
FIG. 5 shows the ornament of FIG. 4 in cross section.

FIG. 5 shows the ornament of FIG. 4 in cross section. Tabs (23) on the battery holder (6) are permanently mated with slots (24) on the cap (4). The cap (4) is attached to the globe (2) using matching threads or other leans (not shown). When the cap (4) is removed, the entire electronics assembly (11) is removed at the same time reducing the number of parts that must be handled while replacing the battery (8) or batteries. A light sensor (22) is placed on the same PCB as the light source (10) in relatively close proximity. A diffusing/reflecting cap (21) with extended annular ring (34) encloses the light source (10).

The ornament design as shown if FIG. 5 has a pressure relief opening (25). If opening 25 were not present, the air volume contained within the ornament (1) would be relatively sealed when the cap (4) was screwed down firmly against the neck (3). If there is a fairly rapid temperature drop, as might happen during a rain storm with falling temperatures, a vacuum will be built up inside the ornament (1). The formula that governs this is the perfect gas law, which is PV=nRT, where P is pressure, V is volume, n is the number of moles, R is the gas constant and T is temperature in degrees Kelvin. In the case of a sealed globe V, n, and R are constants, and what remains is a linear relationship between pressure and temperature. Therefore a globe at 46 F when cooled to 32 F, which is a reasonable scenario, undergoes a temperature change from 281K to 273K, or a drop of about 3%, A corresponding drop in pressure of 3%, if we start at sea level with a pressure of 14.7 lbs/sqft, results in a 3% drop in pressure, or about 0.4 psi. Viewed instead as head of pressure, a 3% change in pressure starting with atmospheric pressure at 33.9 ft, results in about 1.0 head-ft of pressure. Or in layman's terms this means the vacuum generated inside the globe is sufficient to suck the water to the top of a 12" straw. Therefore, if there is any possible leakage path in the globe, there is a strong propensity of the globe to suck in air, and also if the globe is wet or being rained upon to suck in water at the interface between neck (3) and cap (4). The opening (25) relieves the pressure difference and so prevents the ornament from sucking in water. The opening 25 also provides a drain hole if water does somehow get inside the ornament (1).

Figure 6:
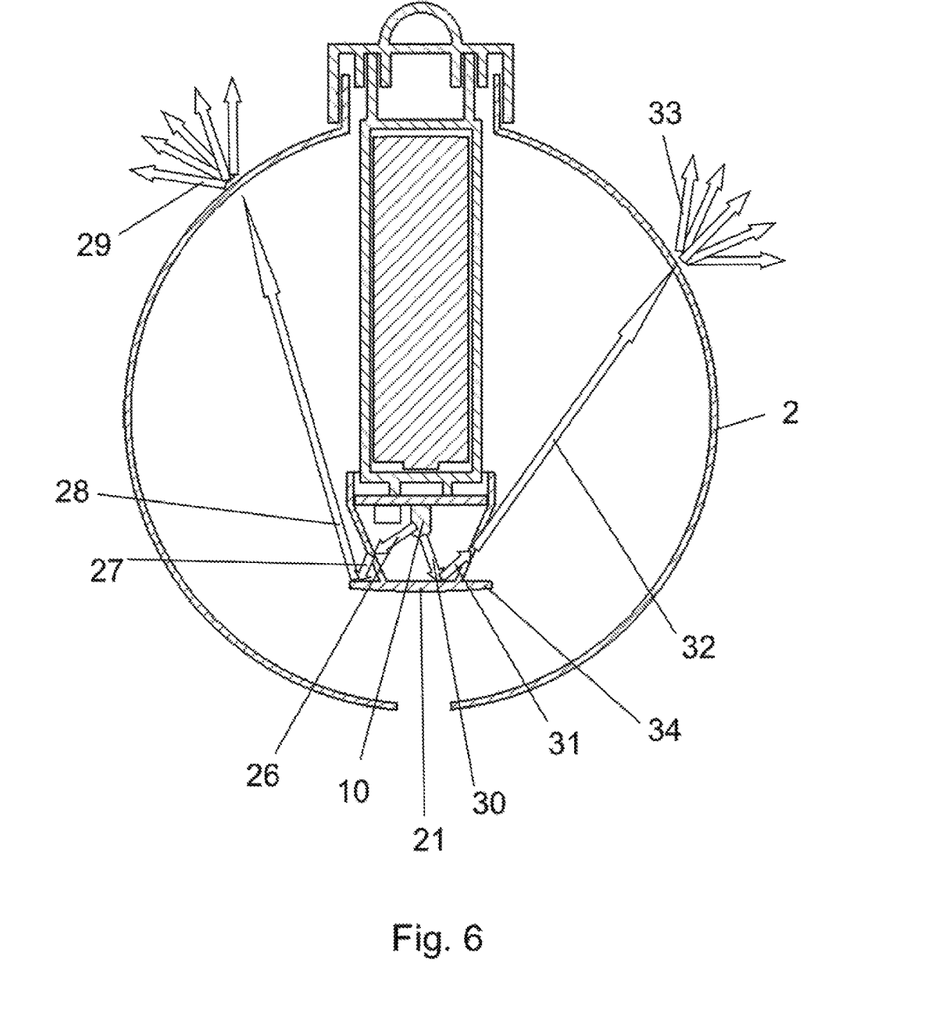
FIG. 6 shows the ornament of FIG. 4 in cross section view with rays indicating the paths of light emitted by the light source as per the current invention.

FIG. 6 shows the ornament of FIG. 4 in cross section with the addition of rays to illustrate the more even illumination achieved by the present invention. Ray (26) leaves the light source (10) and strikes the wall of the diffusing/reflecting cap (21). A portion of it, ray (27), is directed downward where it strikes the annular ring (34) and is reflected upwards as indicated by ray (28). A portion of ray (27) also passes through annular ring (34) (not shown). Ray (28) strikes the globe (2) and is further scattered into rays (29) in a manner determined by the haze properties of the globe (2). The result is that the shadowed surface (18) of FIG. 3 becomes illuminated. Rays (30) through (33) illustrate another potential path to illuminate the shadowed surface (18) of FIG. 3. Ray (30) leaves the light source and strikes the lower surface of diffusing/reflecting cap (21). A portion of it, ray (31), is reflected upwards. A portion of ray (30) also passes through the bottom surface of diffusing/reflecting cap (21) (not shown). Ray (31) then strikes the wall of the diffusing/reflecting cap (21) and a portion of it passes through as indicated by ray (32). Ray (32) strikes the globe (2) and is further scattered into rays (33) in a manner determined by the haze properties of the globe (2). It will be understood that there will be a multitude of rays scattered by the diffusing/reflecting cap (21) in multiple directions resulting in a relatively even illumination of the entire globe surface.

Figure 7:
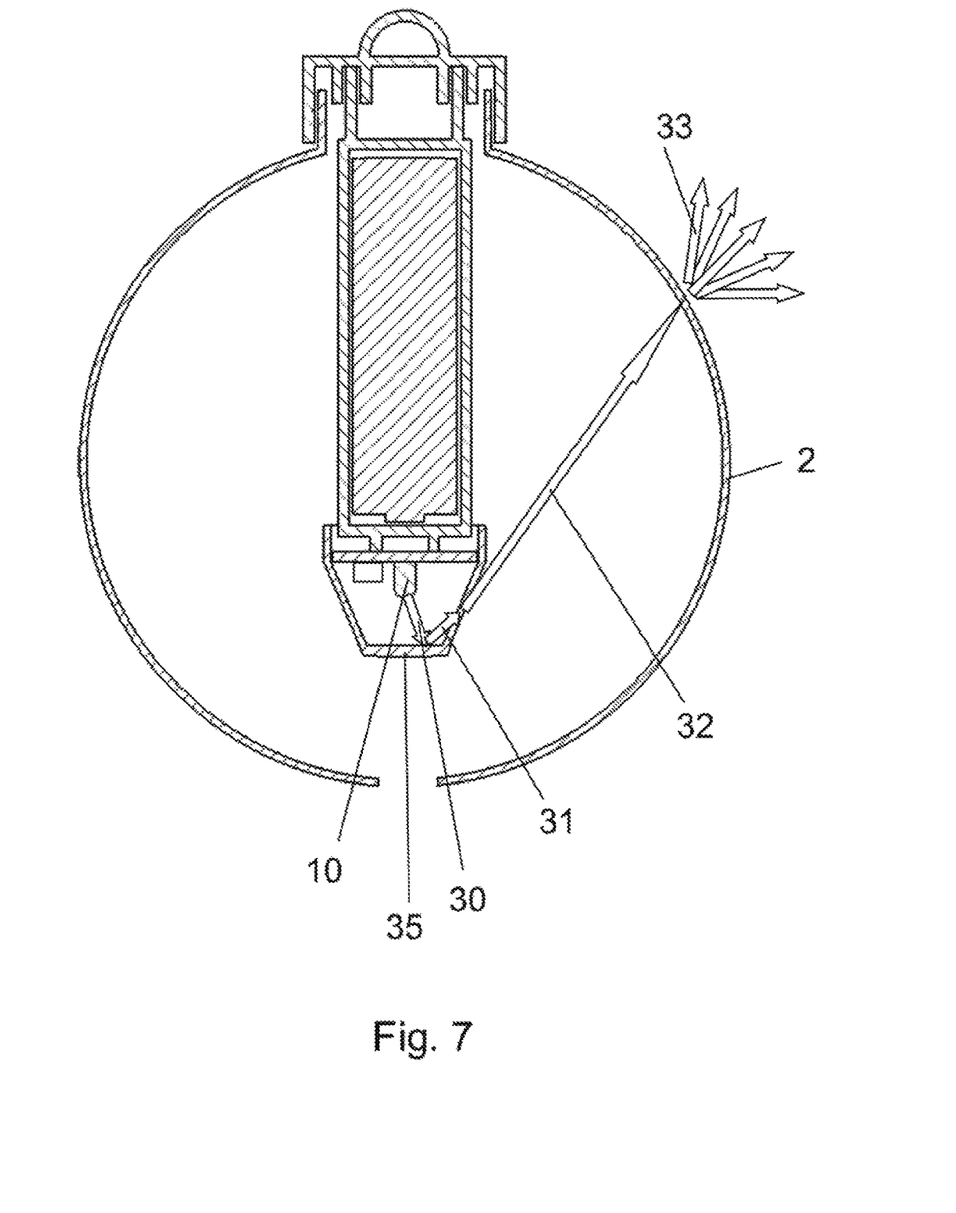
FIG. 7 shows a cross section view of an alternate construction of the present invention.

FIG. 7 shows an alternate construction of the diffuser/reflector cap (35) which does not include an annular ring but instead relies primarily on reflections from inner surfaces, as illustrated by ray (31), and upon the haze of the diffuser/reflector cap (35) to direct rays to the shadowed surface (18) of FIG. 3.

Figure 8:
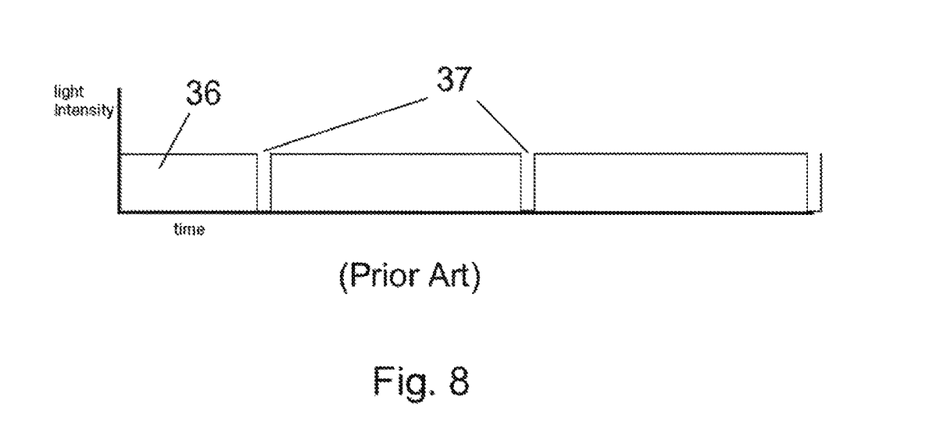
FIG. 8 shows the light intensity emitted from a light source that is periodically, briefly turned off in order to not interfere with the ambient light levels detected by a light sensing device in close proximity to the light source.

FIG. 8 shows a graph of light intensity (36) versus time for a light source that has brief periods (37) when it is periodically tuned off in order to allow a light sensing device that is in close proximity to measure the ambient light level without interference from the light source. If these brief periods are separated by less than about 30 mS, they will not be perceived by the human eye and the light source will appear as a constant glow with a perceived intensity that is set by the ratio of the amount of time the light is on to the amount of time the light is off. However, if the distance between the brief periods when the light is off is less than 30 mS, then the time that the light is off (37) must be significantly less than 30 mS or there will be a significant reduction in the perceived intensity of the light. This period of time may be too short to accurately measure the ambient light level, especially in battery operated products where it is desirable to operate the light sensing device a very low currents. If the brief periods (37) when the light is off are more than 30 ms apart, the light intensity will visibly flicker.

Figure 9:
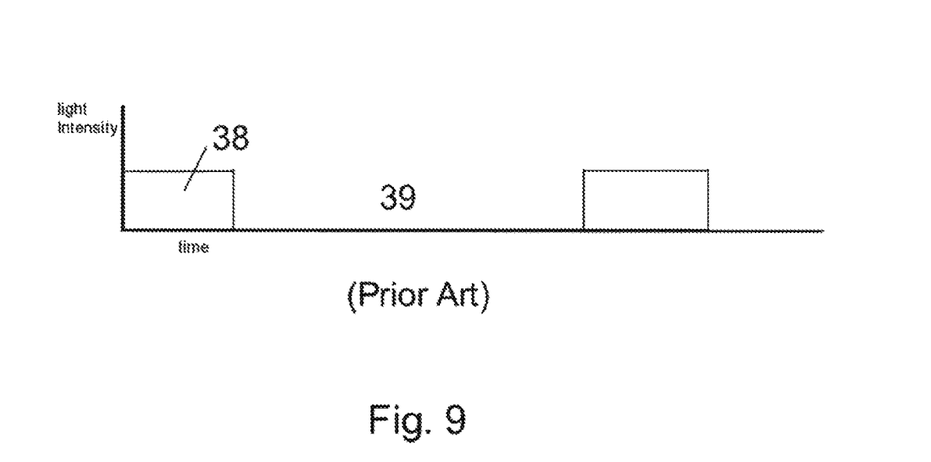
FIG. 9 shows the light intensity emitted from a prior art light source that is blinked on and off to conserve battery power.

FIG. 9 shows the light intensity of a typical prior art ornament that blinks the light on and off in order to achieve acceptable battery life. The light source is on (38) for a relatively long time, usually 1 or 2 seconds. Then the light source is off (39), during which time an ambient light sensor can measure the ambient light levels without interference from the light source. Current consumption is decreased by the ratio of the on time (38) to the sum of the on time (38) and off time (39). The on time (38) can be chosen to be long enough to provide an interesting amount of illumination. The off time (39) can be chosen to provide a desired battery life for batteries of a given capacity. While effective for achieving a desired battery life, the decorative visual affect when using this approach suffers since the light source is off a large portion of the time.

Figure 10:
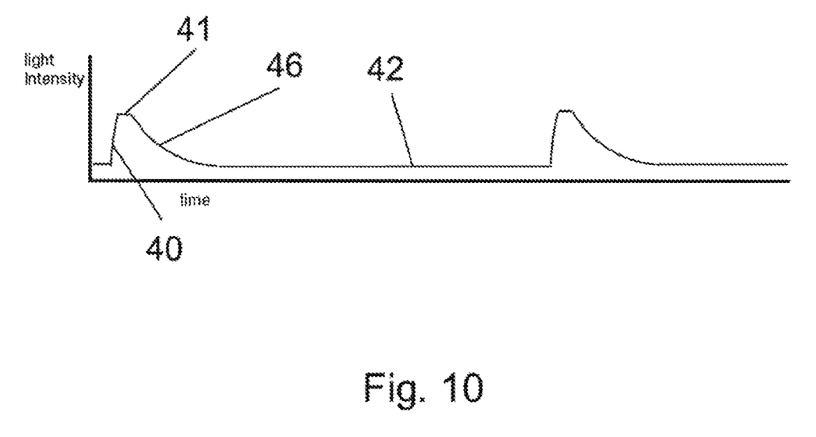
FIG. 10 shows the light intensity emitted from a light source of the current invention with four intervals of differing intensity that are selected to provide a pleasing visual effect that never appears to be completely off where the durations and intensities of each interval are chosen in such a manner as to result in a desired battery life given the nominal capacity of the batteries.

FIG. 10 shows a method per the present invention that provides a more pleasing visual display while maintaining extended battery life. It is known that dark adapted eyes can easily see a surface that under daylight conditions would not appear to be illuminated. U.S. Pat. No. 6,992,591 describes a method for energizing an LED at very low current levels to illuminate a surface that is visible to dark adapted eyes and is incorporated here. Instead of turning the LED light source (10) completely off to conserve battery power, the light source is reduced to a level (42) as described in the 591 patent. As it is anticipated that the ornament (1) will only be illuminated at night when viewers will have dark adjusted vision, the surface of the ornament (1) will always appear to be illuminated providing a much improved visual experience when compared to prior art ornaments that turn completely off. To further enhance the visual effect, the on time (38) of FIG. 9 is reshaped to provide a more pleasing effect. The light source intensity first increases rapidly (40) which draws immediate attention from the viewer. The rise time of section (40) can be selected to avoid an overly harsh transition which may not be pleasing. The light source intensity can then remain high for a period of time (41) which may be between 0 and several hundred milliseconds. Section (41) is then followed by a gradually decreasing section back to the level of (42) for light adjusted eyes. The time constant of section (46) is selected to provide a pleasing visual experience. The area under the curves of FIG. 9 and FIG. 10 determine the amount of battery capacity that is used by each waveform. Matching the area under the curves of sections 40, 41, 46, and 42 to the area under the curve of section 38 results in identical battery life but with a much improved visual experience.

Figure 11:
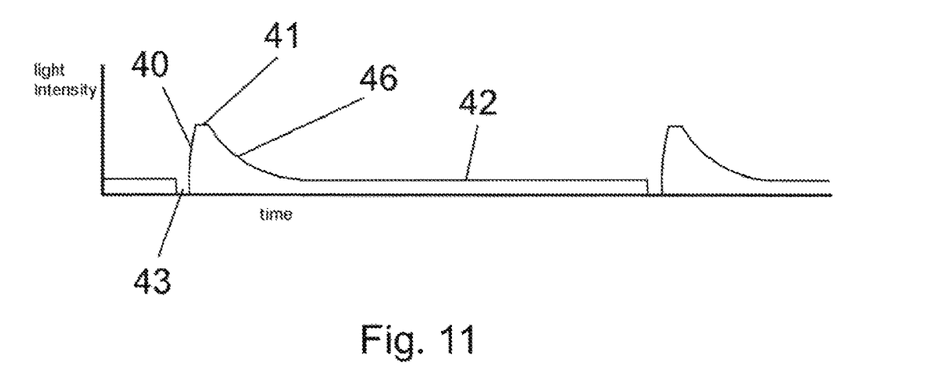
FIG. 11 shows the light intensity emitted from a light source of the current invention with a brief period where the intensity of the light source is set to zero in a manner that will not be perceived by the human eye.

FIG. 11 shows a preferred embodiment of the intensity pattern for the present invention. A brief section (43) of zero intensity is inserted in order to allow a light sensing device (22) to measure the ambient light levels without interference from the internal light source (10). In order to prevent section (43) from causing a noticeable flick in the light intensity, it is immediately followed by a sudden increase in light intensity, section (40). While the eye can easily detect a blink as shown in FIG. 8, it cannot distinguish between two blinks in quick succession so the blink caused by section (43) will not be noticed as long as the rise time of section (40) is fast enough.

A pulse of increased intensity is defined by section (40), (41), and (46) where section (41) may have zero length. The rise time of section (40) is chosen to be fast enough that a brief period of zero intensity immediately prior to section (40), section (43), is not noticeable to the human eye. In a preferred embodiment, section (43) is less than 100 mS in length and the rise time of section (40) is less than 250 mS. Section (43) may be eliminated in designs that do not require the light source (10) to be turned off to measure ambient lighting conditions. In the preferred embodiment, section (46) has a fall time that is at least five times greater than the rise time of section (40). For the remainder of the time not defined by sections (43), (40), (41), and (46), the intensity is set to a non-zero level (42) that is visible to night adapted eyes. The intensity of section (42) is less than one third the intensity of section (41). The length of section (42) is at least twice the combined length of sections (43), (40), (41), and (46).

Those skilled in the art will recognize that the intensity patterns described by FIGS. 8 thru 11 may be generated in a multitude of ways including, but not limited to; an application specific integrated circuit (ASIC), an embedded microprocessor, or discrete circuits using logic gates, counters/timers, etc.

While this invention has been described as having an exemplary design, the present invention may be further modified within the spirit and scope of this disclosure. This application is therefore intended to cover any variations, uses, or adaptations of the invention using its general principles.

What is claimed is:

1. A method of illuminating an ornament comprising an electric light emitting source coupled to a battery power source and a control circuit adapted to energize said light emitting source at desired light intensities over desired durations of time, wherein light emitted by said light emitting source travels through a wall of said ornament, and wherein said ornament comprises a light sensing device adapted to measure ambient light, said method comprising the consecutively repeating steps of: during a rise time period, increasing the light intensity to a high intensity; during a fall time period which is not less than said rise time period, decreasing the light intensity from said high intensity to a non-zero low intensity; during a remaining time period which is not less than the combined rise time and fall time periods, maintaining the light intensity at said non-zero low intensity; during an off time period occurring between said remaining time period and said rise time period, decreasing and maintaining the light intensity at a zero intensity; and, during said off time period, further comprising the step of measuring the ambient light and either executing or suspending said method in response thereto.

2. The method of claim 1 wherein said off time is less than 100 mS.

3. The method of claim 1 wherein said non-zero low intensity of light is less than one third said high intensity of light.

4. The method of claim 3 wherein said fall time period is at least five times greater than said rise time period and said remaining time period is at least twice as long as the combined rise time and fall time periods.

5. The method of claim 1 wherein said fall time period is at least five times greater than said rise time period.

6. The method of claim 1 wherein said remaining time period is at least twice as long as the combined rise time and fall time periods.

7. The method of claim 1 wherein said fall time period is at least five times greater than said rise time period and said remaining time period is at least twice as long as the combined rise time and fall time periods.

8. A method of illuminating an ornament comprising an electric light emitting source coupled to a battery power source and a control circuit adapted to energize said light emitting source at desired light intensities over desired durations of time, wherein light emitted by said light emitting source travels through a wall of said ornament, said method comprising the consecutively repeating steps of:
during a rise time period, increasing the light intensity to a high intensity;
during a fall time period which is not less than said rise time period, decreasing the light intensity from said high intensity to a non-zero low intensity;
during a remaining time period which is not less than the combined rise time and fall time periods, maintaining the light intensity at said non-zero low intensity;
during an off time period occurring between said remaining time period and said rise time period, decreasing and maintaining the light intensity at a zero intensity;
wherein said non-zero low intensity of light is less than one third said high intensity of light; and,
further comprising the step of, during a high time period occurring between said rise time period and said fall time period, maintaining the light intensity at said high intensity.

9. A method of illuminating an ornament comprising an electric light emitting source coupled to a battery power source and a control circuit adapted to energize said light emitting source at desired light intensities over desired durations of time, wherein light emitted by said light emitting source travels through a wall of said ornament, said method comprising the consecutively repeating steps of:

during a rise time period, increasing the light intensity to a high intensity;

during a fall time period which is not less than said rise time period, decreasing the light intensity from said high intensity to a non-zero low intensity;

during a remaining time period which is not less than the combined rise time and fall time periods, maintaining the light intensity at said non-zero low intensity;

during an off time period occurring between said remaining time period and said rise time period, decreasing and maintaining the light intensity at a zero intensity; and, further comprising the step of, during a high time period occurring between said rise time period and said fall time period, maintaining the light intensity at said high intensity.

10. A method of illuminating an ornament comprising an electric light emitting source coupled to a battery power source and a control circuit adapted to energize said light emitting source at desired light intensities over desired durations of time, wherein light emitted by said light emitting source travels through a wall of said ornament, said method comprising the consecutively repeating steps of:

during a rise time period, increasing the light intensity from a non-zero low intensity to a high intensity;

during a fall time period which is greater than said rise time period, decreasing the light intensity from said high intensity to said non-zero low intensity; and, during a remaining time period which is greater than the combined rise time and fall time periods, maintaining the light intensity at said non-zero low intensity.

11. The method of claim 10 wherein said non-zero low intensity of light is less than one third said high intensity of light.

12. The method of claim 11 further comprising the step of, during a high time period occurring between said rise time period and said fall time period, maintaining the light intensity at said high intensity.

13. The method of claim 11 wherein said fall time period, is at least five times greater than said rise time period and said remaining time period is at least twice as long as the combined rise time and fall time periods.

14. The method of claim 10 wherein said rise time is less than 250 mS.

15. The method of claim 10 further comprising the step of, during a high time period occurring between said rise time period and said fall time period, maintaining the light intensity said high intensity.

16. The method of claim 15 wherein said high time period is at least 200 mS.

17. The method of claim 10 wherein said fall time period is at least five times greater than said rise time period.

18. The method of claim 10 wherein said remaining time period is at least twice as long as the combined rise time and fall time periods.

19. The method of claim 10 wherein said fall time period is at least five times greater than said rise time period and said remaining time period is at least twice as long as the combined rise time and fall time periods.

* * * * *

UNITED STATES PATENT AND TRADEMARK OFFICE
CERTIFICATE OF CORRECTION

PATENT NO. : 9,970,625 B2  
APPLICATION NO. : 14/982626  
DATED : May 15, 2018  
INVENTOR(S) : Kim Irwin McCavit et al.

Page 1 of 1

It is certified that error appears in the above-identified patent and that said Letters Patent is hereby corrected as shown below:

On the Title Page

Item (57) In the Abstract, Line 4, delete "right" and replace with --light--

In the Specification

Column 1, Line 24, delete "tights" and replace with --lights--

Column 1, Line 57, delete "flights" and replace with --lights--

Column 2, Line 1, delete "thine" and replace with --time--

Column 4, Line 14, delete "tong" and replace with --long--

Column 4, Line 31, delete "not" and replace with --light--

Signed and Sealed this  
Twenty-sixth Day of June, 2018

Andrei Iancu  
*Director of the United States Patent and Trademark Office*